May 10, 1960 R. W. KETCHLEDGE 2,936,402

COMMUNICATION SWITCHING SYSTEM EMPLOYING GAS TUBES

Filed April 29, 1954 2 Sheets-Sheet 1

INVENTOR
R. W. KETCHLEDGE
BY
ATTORNEY

May 10, 1960 R. W. KETCHLEDGE 2,936,402

COMMUNICATION SWITCHING SYSTEM EMPLOYING GAS TUBES

Filed April 29, 1954 2 Sheets-Sheet 2

INVENTOR
R. W. KETCHLEDGE
BY
ATTORNEY

United States Patent Office 2,936,402

Patented May 10, 1960

2,936,402

COMMUNICATION SWITCHING SYSTEM EMPLOYING GAS TUBES

Raymond W. Ketchledge, Whippany, N.J., assignor to Bell Telephone Laboratories, Incorporated, New York, N.Y., a corporation of New York Application April 29, 1954, Serial No. 426,337

3 Claims. (Cl. 315—84.5)

Figure 1:
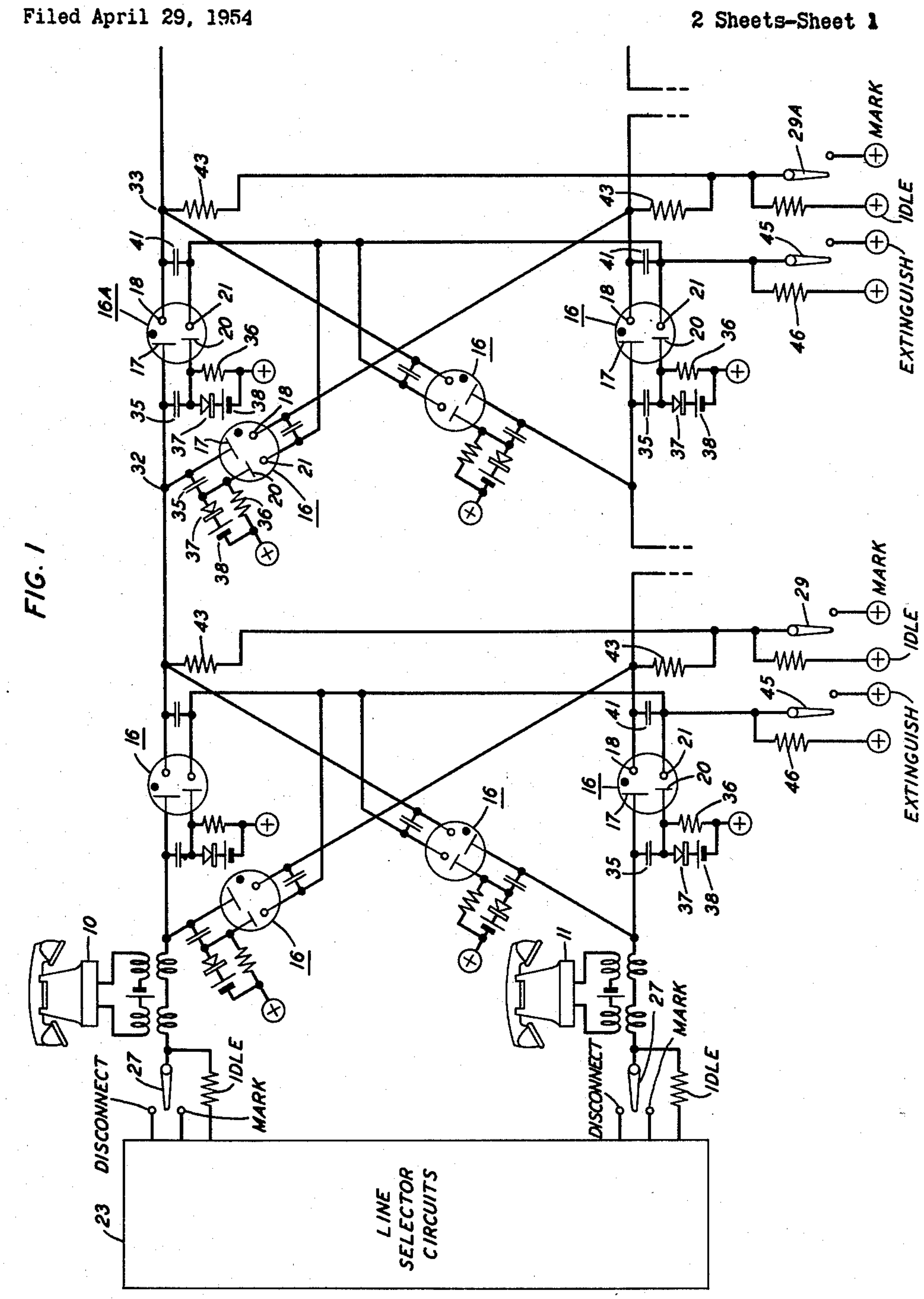
Figure 2:
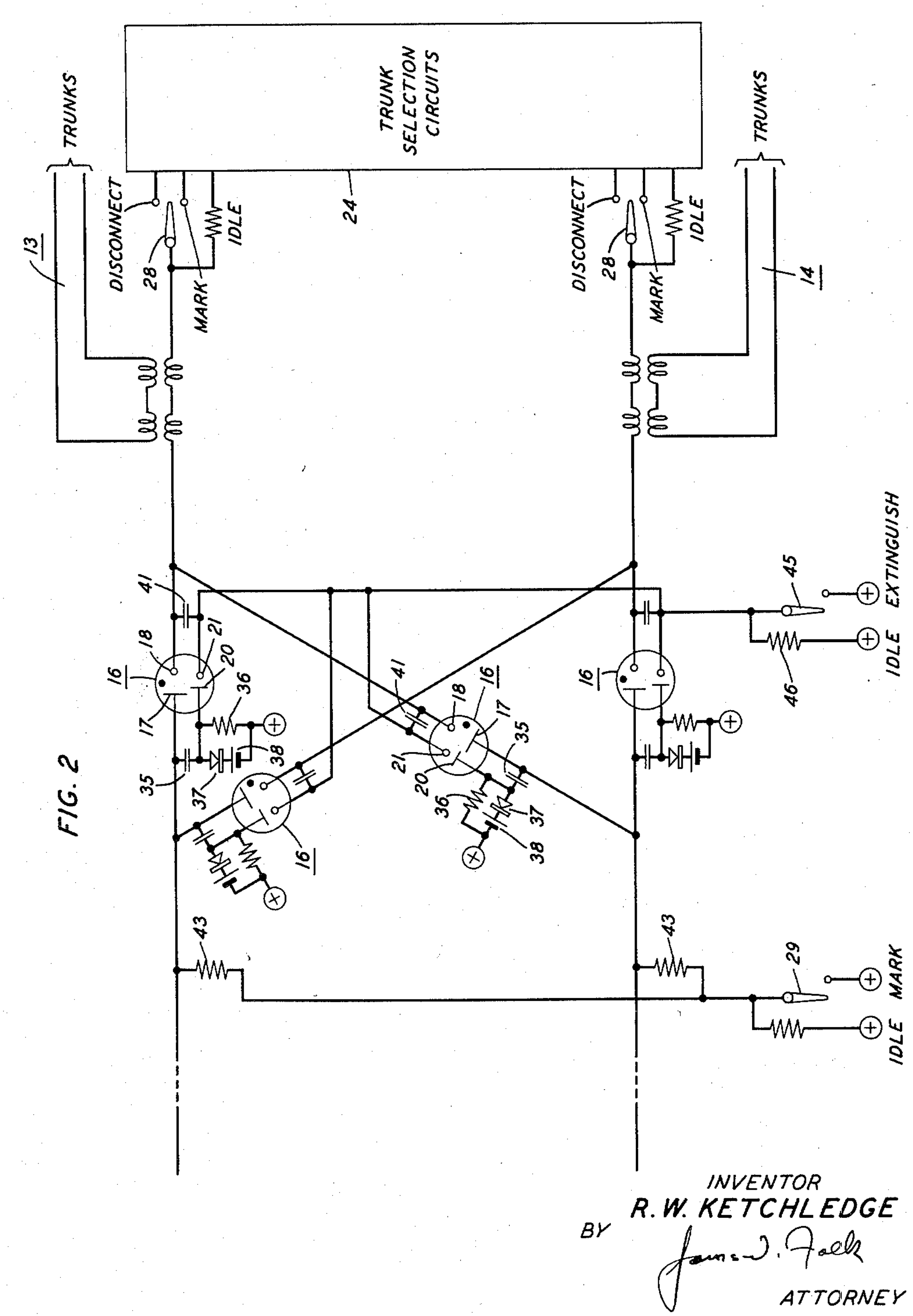

This invention relates to switching networks and more particularly to such networks for use in telephone switching systems employing cold cathode gaseous discharge devices as the switching devices or crosspoints of the network.

In application Serial No. 201,578 filed December 19, 1950, of E. Bruce and H. M. Straube, now Patent No. 2,684,405 issued July 20, 1954, there is disclosed a selective switching network for a telephone system in which a plurality of gas tubes are connected together to define individual paths between any one of a number of inputs, which may each be a subscriber's telephone line, and any one of a number of outputs, which may each be a trunk, either interoffice, or, as specifically disclosed in the Bruce-Straube application, intraoffice. One of these possible paths between a particular line and a particular trunk is broken down by the application of a line marking potential to the line, a trunk marking potential to the trunk, and node marking potentials to the nodes within the switching network. Each connection between the crosspoints in the switching network is a node of the network and, in describing the switching and operation of the network, it is easier to refer to the nodes than to the crosspoints themselves.

In networks of this type, the gaseous discharge devices defining the crosspoints have been diodes; these devices have broken down sequentially to define the talking path. This sequential operation may be from each end, i.e., from both the line and the trunk towards the center of the network, or may be only from the line through the network towards the trunk. Each crosspoint connected to two vacant nodes breaks down on the appearance of a sufficient marking potential at one of the nodes, referred to as the input node. However, a crosspoint connected to the vacant input node at which the marking potential occurs and also to an occupied output node should not break down. There must therefore be considered both the input and the output node conditions in determining whether or not a given crosspoint should break down.

The state of a node can be regarded as either vacant or occupied depending on whether or not crosspoint elements associated with the node are in a conducting state; there may also be considered the nodal state when a mark signal arrives at a vacant node but none of the crosspoints connected to that node has yet broken down, but this state we shall also consider as occupied. In a switching network employed for interconnecting voice circuits each new connection must obviously be made using only vacant nodes and must not disturb occupied nodes which are serving previously established calls, lest cross-connections between the conversations occur.

In prior types of circuits employing gas tube crosspoints, the number of stages in the network has been quite limited. The marking signal transmitted through the priorly operated crosspoint tubes to a particular node must be distinguishable, besides being sufficient to break down the crosspoint to a vacant output node but not to an occupied output node. The prior limitation on the number of switching stages has been due to variations in the breakdown and sustaining voltages of gas tubes employed as the crosspoints. The breakdown voltage applied to a tube in the interior of the switch is transmitted to it through the sustaining voltages of the connecting stages, the stages that had priorly operated in the sequential breakdown of the tubes that define the talking path. This has introduced problems of tolerances and limits, as the extreme cases must be considered in which each prior sustaining voltage is either at the maximum or at the minimum tolerable sustaining value. Due to practical limitations in accurately determining the sustaining voltage and in separating the sustaining and breakdown voltages, the number of stages has been limited by these possible variations in tube characteristics. Accordingly, as prior types of networks have depended on the transmission of accurate direct current voltages through the network by the priorly operated tubes, the variations in the sustaining voltages of these prior tubes and hence of the direct current marking voltage transmitted therethrough have limited the number of stages in the switching network.

It is a general object of this invention to provide improved switching networks employing gas tubes as crosspoint devices.

It is another object of this invention to increase the number of stages of gas tube crosspoints in such networks.

It is a further object of this invention to insure accurate operation of appropriate crosspoints in the interior of a switching network on application of a marking potential to a vacant node regardless of the possible variations in the sustaining voltages of priorly operated crosspoints of the switch.

These and other objects of this invention are attained in specific embodiments thereof wherein the crosspoint is operated or broken down not by the direct current voltage transmitted to it through the priorly operated crosspoint tubes, but on recognition of the shift in the input node condition from vacant to occupied when the direct current potential is applied from a priorly operated crosspoint. The voltage transmitted through the gas tubes is, of course, a direct current voltage, but the shift of an input node from vacant to occupied is detected on an alternating current basis and similarly the fact that an output node, connected to the other side of the crosspoint tube, is vacant, is detected on an alternating current basis. By the phrase "on an alternating current basis" is meant on a basis of recognition of transient increments and decrements of voltage.

In one specific illustrative embodiment of the invention, the gas tubes defining the crosspoints include a starter gap as well as the main gap. The starter anode of this starter gap is connected to the main anode through a capacitor, and is also connected by a biasing resistor to a source of positive potential. An amplitude limiter, comprising, for example, a diode and a voltage source, is connected across the resistor; by putting an amplitude limiter on the input side in the starter gap circuit, the only requirement on the input voltage transmitted through the prior tubes to this node and which shifts this node from vacant to occupied is that it be in excess of the voltage required to break down the starter gap of the tube when the appropriate output node condition is present. Advantageously, the main gap breakdown is maintained high compared to that of the starter gap; thus the mark voltage transmitted through the prior tubes in the path need only be within the very wide range defined by the voltages larger than the voltage of the amplitude limiter, and smaller than the main gap breakdown voltage.

In addition to the condition required to be present at the input node there is a set of conditions required at the output node if the crosspoint between these two nodes is to break down; specifically, as mentioned above, a crosspoint is to break down only if both the input and output nodes are vacant and a mark voltage appears at the input node. In accordance with specific embodiments of this invention each gas tube includes a starter cathode defining with the starter anode the starter gap and connected through a capacitor to the output node, which is pulsed. If the output node is vacant, the starter cathode voltage follows the negative pulse, and the combination of the direct current biases on the starter gap, the input node pulse, and the output node pulse fires the starter gap. However, if the output node is occupied the starter cathode does not follow the pulse and the starter gap does not fire.

It is a feature of this invention that the gas tubes defining the crosspoints in a switching network include distinct starter gaps which are fired on recognition of a shift in the voltage of the nodes to which the crosspoint tube is connected.

It is a further feature of this invention that the starter gap include a starter anode to which a suitable direct current voltage bias is applied, and which is connected through a capacitor to the main anode of the crosspoint tube.

It is another feature of this invention that a direct current bias be applied to the starter anodes of the crosspoint tubes and a voltage limiter be also connected to the starter anodes to limit the voltage pulse applied to the starter anodes on the shift of the condition of the input node from vacant to occupied.

It is a still further feature of this invention that the starter gap include a starter cathode coupled to the main cathode by a capacitor so that the condition of the output node can be recognized by the starter cathode on an alternating current basis.

It is sill another feature of this invention that the starter cathode be connected to an appropriate bias, negative with respect to the bias applied to the starter anode, and that a pulse, negative with respect to the bias on the cathode, be applied to the output node so that the starter cathode potential follows the pulse only if the output node is vacant.

A complete understanding of this invention and of the features thereof may be gained from consideration of the following detailed description and the accompanying drawing, the two figures of which, when placed side by side, are a schematic representation, partially in block diagram form, of a portion of a switching network incorporating gas tube crosspoints in accordance with aspects of this invention.

Turning now to the drawing, there is depicted a portion of a gas tube crosspoint switching network for connecting subscriber telephones 10, 11, etc., to any of a number of trunks 13, 14, etc. The switching network comprises a plurality of gas tubes 16 each having a main gap, defined by an anode 17 and a cathode 18, and a starter gap, defined by a starter anode 20 and a starter cathode 21. The tubes 16 are cross connected between nodes of the network so that a talking path may be established through the network between any subscriber 10, 11 and any trunk 13, 14 under control of line selector circuits 23 and trunk selector circuits 24; the line and trunk selector circuits and their operation in applying mark potentials to the line and trunk ends of the switching network and to the individual nodes in the network may be as set forth in application Serial No. 201,578, filed December 19, 1950, of E. Bruce and H. M. Straube, now Patent No. 2,684,405, issued July 20, 1954. Each connection between gas tubes 16 in the network is referred to as a node of the network, and the marking potentials are applied to these nodes to effect breakdown of the tubes 16. The main gaps of the tubes 16 may be arranged and proportioned to exhibit a negative resistance when operated in the talking path, as set forth in application Serial No. 169,121, filed June 20, 1950 of M. A. Townsend, now Patent No. 2,804,565, issued August 27, 1957.

When it is desired to effect a connection between a subscirber 10, 11 and a trunk 13, 14 the line switch 27 for that subscriber is connected to a mark potential and similarly the trunk switch 28 for that trunk is connected to a mark potential; additionally each of the node switches 29 is connected to a mark potential. The exact values of the mark, idle and disconnect potentials will depend on the number of stages in the switching network and the characteristics of the tubes 16, as discussed further below.

The starter anode 20 of each crosspoint tube 16 is connected to the input node by a capacitor 35 and to a starter anode bias source by a resistor 36 across which is connected the amplitude limiter circuit comprising the diode or other asymmetrically conducting element 37 and the voltage source 38. The starter cathode 21 of each tube 16 is connected to an output node of that stage of the switching network by a capacitor 41 and is also connected to a source of cathode bias potential through a resistor 46. An extinguish voltage may be applied to each starter cathode through a switch 45, as described further below. Each output node is also connected to a base voltage, referred to as the idle voltage, by a resistor 43.

To appreciate the operation of each crosspoint in a switching network in accordance with this invention, let us consider the breakdown of the crosspoint tube 16A between the input node 32 and the output node 33. Due to the closing of switches 29 and 29A and the breakdown of a prior tube 16 in the network, a mark voltage is applied to the input node 32. This mark voltage is insufficient to break down the main gap of tube 16A, and the shift in voltage due to the mark signal is itself insufficient to break down the starter gap.

The shift of the input node from vacant to mark, or occupied, is detected on an alternating current voltage basis and applied to the starter anode 20 through the capacitor 35. The positive voltage bias is applied to the starter anode 20 from a voltage source through the resistor 36 across which is connected the limiter circuit comprising the diode 37 and the voltage source 38. The mark signal current flows through capacitor 35 and resistor 36 to the voltage source, applying a positive signal to the starter anode 20. The magnitude of the voltage jump on shift of the condition of the input node 32 from vacant to occupied is of course affected by the possible variations in the sustaining voltages of the priorly operated tubes 16 in the switching network, as in prior circuits of this type. However, in accordance with an aspect of this invention, these variations have no effect on the possible operation of the next cross-point tube as a transient voltage resulting from the shift in the condition of the input node is employed in circuits in accordance with this invention to determine and detect the condition requisite for breakdown, but not to effect the breakdown itself.

In accordance with another aspect of this invention, the limiter across the resistor 36 allows the shift of voltage at the input node to be quite large and vary within considerable limits without firing the starter gap in the absence of the appropriate output node condition.

Thus when the input node shifts from its vacant condition to its occupied condition, a direct current voltage, of variable magnitude, is applied to the main anode 17 and an alternating current signal, superimposed on a direct current voltage bias, is applied to starter anode 20.

The output node requirement is that the starter gap should break down if the output node is vacant, but not if it is occupied on a priorly set up path through the switching network. This is attained by connecting the starter cathode, through the resistance 46 to a voltage source, negative with respect to the voltage applied to the starter anode 20, and also connecting the starter cathode 21 through the capacitor 41 to the main cathode 18 and the output node 33. When the operator throws switch 29A to the mark potential for that stage of the network, the direct current voltage at the node 33 decreases, assuming the node to be vacant, and the starter cathode 21, being coupled to the node 33 through the capacitor 41, follows this shift, having a voltage pulse superimposed on the normal direct current bias on the starter cathode. The application of this pulse to the starter cathode 21 simultaneously with the application of the marking signal to the starter anode 20 effects breakdown of the starter gap.

The voltage of the output node 33 when the node is occupied is the same as the normal idle voltage applied to the nodes of that stage of the switching network. When the switch 29A is shifted by the operator the mark position current would flow from node 33 through resistor 43 to the mark voltage source, the potential at the output node 33 thus not changing and no mark signal being applied to the starter cathode 21. Accordingly the starter gap will not break down.

After the discharge has transferred from the starter gap to the main gap of the crosspoint tube 16A, it is desirable to extinguish the starter gap. This may be attained by the switch 45 which applies an extinguishing voltage to the starter cathode 21 in place of the normal bias potential after the discharge has transferred. Advantageously switch 45 is operated by the operator and may be operated when the switch 29A is released from its mark position.

It is apparent, therefore, that the mark signals applied to the main anode and cathode are insufficient to break down the main gap and that the direct current voltage bias across the starter gap in combination with either pulse alone is insufficient to break down the starter gap, but in combination with both pulses does effect break down of the starter gap, and thus of the crosspoint. It is also apparent that the operation of the crosspoint is not dependent on the transmission through the prior stages of the switching network of accurate direct current marking voltages. Accordingly the number of stages in the switching network may be considerably increased.

When an established path tthrough the switching network is to be broken down, the operator can apply disconnect voltages to either end of the path, or to both ends, by the switches 27 and 28 as described in the above-mentioned Bruce-Straube application.

The exact values of the various voltages utilized in this circuit will depend on the number of stages in the switching network and the characteristics of the tubes 16. Representative values can be appreciated from the following discussion of the voltages applicable to the single crosspoint tube 16A assumed to have a main gap breakdown voltage of 200 volts, a starter gap breakdown voltage of 150 volts, and sustaining voltages of 100 volts. The voltage base for any crosspoint tube 16 is the voltage of the output node 33 which, as described above, remains constant regardless of the condition of the node; this voltage we shall designate as $E_0$ volts as it is different for each stage of the network. The marking voltage for the output node 33 may then be $E_0-35$ volts.

The normal or idle voltage at the input node 32 is the idle voltage of the prior stage of the switching network, and may be $E_0+110$ volts. The voltage across the tube 16 is thus 10 volts more than the sustaining voltage of 100 volts. The direct current marking voltage transmitted to the input node 32 through a prior tube 16 may be of the order of $E_0+150$ volts; as the breakdown voltage of the main gap is 200 volts and the voltage across the main gap when the input node is thus marked is only 150 volts, the main gap will not be broken down.

The shift in the input node voltage in marking by a signal transmitted through the switching network is thus 50 volts and this is applied, through the capacitor 35, to the starter anode 20. The starter anode bias may be of the order of $E_0+95$ volts; if the full 50 volt signal were added to the starter anode bias, the resultant peak voltage would still be 5 volts less than the breakdown voltage of the starter gap. However, due to possible variations in the sustaining voltages of the prior tubes, which may alter the signal transmitted to the starter anode through the capacitor 35, and due also to variation in the value of the breakdown voltage of the starter gap itself, this is not a safe margin and erroneous operation of the starter gap could occur when the output node is occupied. Therefore, in accordance with an aspect of this invention as discussed above, the maximum starter anode voltage is limited by a limiter circuit including the voltage source 38 which may be of the order of $E_0+130$ volts.

The starter cathode bias may be of the order of $E_0$ volts so that the voltage across the starter gap in the absence of a starter cathode pulse is insufficient to break down the starter gap. This starter cathode pulse is applied through capacitor 41 when the switch 29A is closed, assuming the output node to be vacant, and is $-35$ volts, so that the voltage across the starter gap when the input and output node logic is present requesting the crosspoint to break down is 165 volts, sufficient to break down the starter gap.

The voltage required to extinguish the starter gap is merely some voltage that would drop the voltage across the gap below the sustaining voltage for the starter gap and may be of the order of $E_0-25$ volts.

It is to be realized, of course, that the voltages applied to the input and output nodes of one stage of the switching network are related to the voltage applied to the other stages as each nodal point in the interior of the network is both an input node of a succeeding stage and an output node of a prior stage. Thus the voltages across any number of stages may be determined from a consideration of the voltages across any one stage of the network.

While each stage of the switching network depicted in the drawing and described herein has been assumed to include both a starter and a main gap, the mark signals applied directly from the line selector circuits 23 to the first stage crosspoint tubes 16 are not altered by having to pass through prior crosspoint tubes and, accordingly, the crosspoint tubes of the first stage may advantageously be diodes having only a main gap.

Further in the above discussion of representative voltage values, both the voltage applied to the starter anode and the voltage applied to the starter cathode included the base voltage $E_0$. As these electrodes are direct current isolated from the main gap electrodes, the application of the base voltage to the starter gap electrodes is not essential. However, the voltage applied to the starter electrodes must be sufficiently close to that applied to the main electrodes to assure that no paths are broken down between the starter and main gap electrodes; this can most easily be assured by using the same base voltage for both gaps.

It is to be understood that the above-described arrangements are illustrative of the application of the principles of the invention. Numerous other arrangements may be devised by those skilled in the art without departing from the spirit and scope of the invention.

What is claimed is:

1. In a communication switching circuit, a plurality of input lines, a plurality of output lines, and means defining paths between any of said input and any of said output lines, said means comprising a plurality of gaesous discharge devices each comprising a main anode and a main cathode defining a main gap and a starter anode and starter cathode defining a starter gap, means for applying direct current marking potentials to said main anode and cathode, capacitance means coupling said starter anode to said main anode and said starter cathode to said main cathode to break down said starter gap on application of said marking potentials, and means limiting the maximum potential applied to one of said starter electrodes.

2. In a communication switching system in accordance with claim 1, the combination further comprising means biasing said starter anode and said starter cathode so that said starter gap does not break down except on application of the marking potentials to both said main anode and main cathode.

3. In a communication switching circuit, a crosspoint device comprising a gaseous discharge device having a main anode, a cathode defining a main gap therewith, and a starter gap including a starter anode, capacitance means coupling said starter anode to said main anode, means applying a bias potential to said starter anode to bias said starter gap below its breakdown voltage, means for applying a direct current marking voltage to said main anode and to said cathode, the marking voltage being applied through said capacitance means to said starter anode, and means limiting the voltage applied to said starter anode.

References Cited in the file of this patent

UNITED STATES PATENTS

| | | |
|---|---|---|
| 2,103,439 | Swart | Dec. 28, 1937 |
| 2,457,125 | Chatterjea | Dec. 28, 1948 |
| 2,473,831 | Stutsman | June 21, 1949 |
| 2,495,301 | Wengel | Jan. 24, 1950 |
| 2,564,125 | Mohr | Aug. 14, 1951 |
| 2,629,021 | Robertson | Feb. 17, 1953 |
| 2,684,405 | Bruce et al. | July 20, 1954 |
| 2,688,661 | Van Mierlo | Sept. 7, 1954 |
| 2,722,567 | Davison et al. | Nov. 1, 1955 |
| 2,780,674 | Six et al. | Feb. 5, 1957 |